June 26, 1934.  R. C. ELLIS  1,964,564
SUPPORT FOR AUTOMOTIVE RADIOS
Filed March 11, 1932

Inventor
RAY C. ELLIS
By Spencer, Hardman & Fehr
Attorneys

Patented June 26, 1934

1,964,564

UNITED STATES PATENT OFFICE 1,964,564

SUPPORT FOR AUTOMOTIVE RADIOS

Ray C. Ellis, Dayton, Ohio, assignor, by mesne assignments, to Radio Corporation of America, New York, N. Y., a corporation of Delaware Application March 11, 1932, Serial No. 598,179

9 Claims. (Cl. 180—68.5)

This invention relates to the installation of radio equipment upon an automotive vehicle, and it is directed particularly to the support and housing of one of the separable units of such equipment.

Due to the design of the automotive vehicle, there is usually little space left within which to mount one or more of the several units necessary for radio installation. In many instances where radio installations can be made, the said units are relatively inaccessible from the point of service, especially when the vehicle is loaded with passengers. To solve these problems the applicant has devised a sealable enclosure that may be slung beneath the body of the vehicle and secured to the floor boards thereof in any available space, and that will provide for ready access to the contents of the enclosure without disturbing the passengers of the vehicle, or any interior fittings thereof. Such a proposed installation makes for very favorable housing of either the B batteries, the fixed tunable unit of the receiving apparatus, or even the dynamotor power supply or other similar units that may be included in a radio equipped automotive vehicle. In the instance of the latter types of separable units the enclosure makes for the proper shielding of those elements that might ordinarily cause interference or other disturbance in the radio reproduction.

It is therefore one of the objects of the instant invention to provide a battery box, or an enclosure for another unit or units of an automotive radio, that will give ready access thereto without the necessary disturbance or inconvenience to the said fittings of the vehicle or its passengers. This has been accomplished by securing a cover member beneath the floor boards of the vehicle and providing a receptacle with detachable fittings for securing the receptacle to the cover.

Another object of the invention is to provide a weather-proof enclosure for a separable unit of an automotive radio. This has been accomplished by providing a receptacle and cover for proper mating relation and a suitable sealing strip at the juncture of said receptacle and cover, with means for forcing the receptacle against the sealing strip so as to prevent the entrance of deleterious elements, such as slop and water splashed up from the road.

Another object of the invention is to provide an enclosure for a separable unit of an automotive radio receiver that will provide for radio reception without the attendant noise disturbance. This has been accomplished by providing shielding enclosure for the said unit having the least possible number of parts and which are properly metallically connected so as to provide a proper shield for said separable unit.

Further objects and advantages of the present invention will be apparent from the following description, reference being had to the accompanying drawing wherein a preferred embodiment of one form of the present invention is clearly shown.

Figure 1:
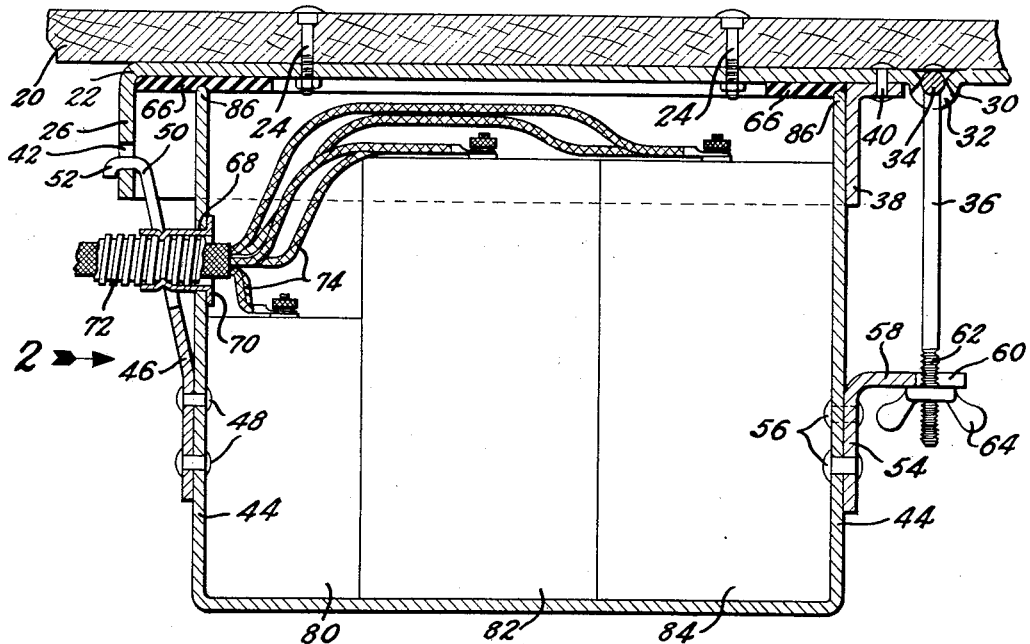
Fig. 1 is a sectional view disclosing the instant invention substantially as indicated by the line and arrows 1—1 of Fig. 2.
Figure 2:
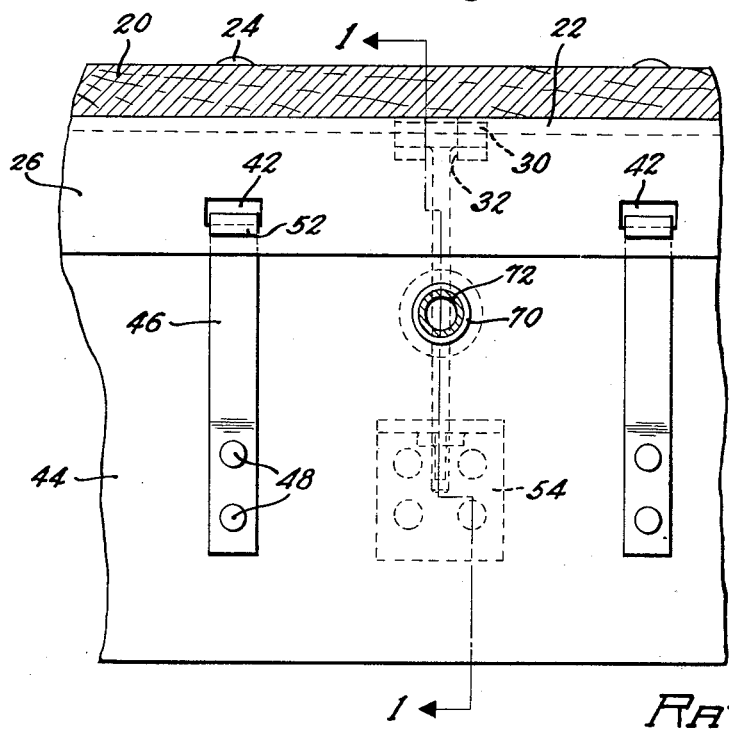
Fig. 2 is an elevational view substantially as indicated by the arrow 2 of Fig. 1.
Figure 3:
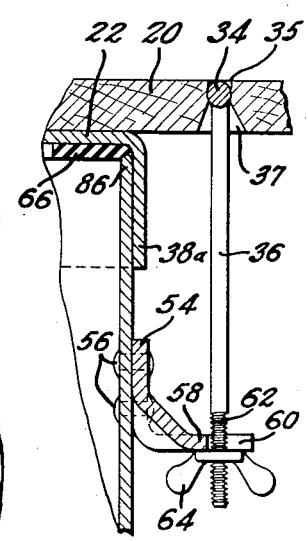
Fig. 3 is a detail showing a modification.

With particular reference to the drawings 20 is indicative of the floor boards or similar structure of the automotive vehicle, and has secured to it a cover member 22 by means of bolts or similar devices 24. The cover member 22 may be of any desirable construction but it is preferred to be one having a deep flange 26 depending from the body thereof and of integral formation. In the form illustrated in Fig. 1 the flange 26 extends about three sides of the cover and the fourth side is left flat or extending along the plane of the body of the plate 22 as at 28 where a portion thereof is depressed into a loop 30, which loop is apertured at 32 so as to provide for the passage and journalling of the head 34 of a T-bolt 36. In this form of construction the fourth side of the cover is closed by a flanged member 38 secured to the member 22 in any preferred manner as by the rivets 40. At appropriate points in the end of flange 26 apertures 42 are provided for a purpose to be described. The cover 22 may be provided with the depending flange 26 on all four sides as illustrated at 38a in Fig. 3. When that form of construction is adopted seating of the head of the bolt 36 is accomplished by providing a recess 35 in the floor boards 20 to accommodate the head 34 of the bolt and an aperture 37 through the boards 20 makes for the passage of the shaft of the bolt. In either instance the apertures 32 or 37 are sufficiently larger than the cross section of the bolt to permit the same to swing somewhat as will presently appear.

Mating with the cover 22 in substantially telescopic engagement there is provided a chambered member 44 to which is secured resilient hooks 46 as by means of the rivets 48, which hooks have their free ends 50 diverging from the body of the member 44, and are provided with the reentrant bends 52. These hooks are so positioned or spaced upon the side wall of the member 44 as to cooperate with the apertures 42 of the flange 26. At the opposite end of the member 44 a bracket 54 is secured by means of rivets 56 or similar devices and which has an extension 58 providing a slot 60 for cooperation with the depending end of the T-bolt 36, the T-bolt being threaded as at 62 and provided with a wing nut or similar device 64 that may be run up to engage the slotted end of said bracket extension.

One or the other of the receptacle members, that is, the cover 22 or the chamber member 44, is provided with a sealing strip 66 so as to be engaged by both the cover and the chamber member when the parts are properly assembled. It is desirable to have this sealing strip 66 secured to the cover member 22 by means of an appropriate cement, rivets or other equivalent means. At one end of the chamber member 44 an aperture 68 is provided within which is secured an appropriate sleeve 70 making metallic connection with the member 44 as well as with a flexible tubing 72, all as substantially illustrated. This makes for the proper shielding of leads 74 and units that may be housed within the receptacle or connected thereto.

As illustrated in the drawing, this disclosure makes for the proper housing of the batteries 80, 82 and 84 for use in a radio receiver, with which the leads 74 may be connected, but the invention lends itself admirably to the enclosure of a dynamotor unit for supplying current to the receiver, as well as for housing either all or a part of the receiver mechanism, since both the cover and receptacle member are of metallic construction and are metallically connected one to the other and with the spiral tubing 72, and may if desirable be grounded by a single conductor, thus forming a complete shield to the units. Applicant does not, therefore, by illustrating the receptacle as enclosing batteries only, intend to limit the disclosure to that extent, but contemplates as well the enclosure of such other units as those stated and their equivalents.

In an installation of the character described, whether the receptacle 44 houses a dynamotor power supply unit, batteries or a part of the receiver, the parts contained therein are made readily accessible for service since the service man has only to loosen the wing nut 64 sufficiently to allow the T-bolt 36 to be swung from engagement with the bracket 54 and then let down the receptacle and its contents from within the cover. The receptacle 44 pivots about the hook and flange engagement at 52 until the receptacle is clear of the flange 38, the hooks 46 flexing sufficiently to allow the necessary longitudinal shifting, whereupon the member 46 may be unhooked from the flange 26 and the assembly let down to rest upon the ground where the contents thereof may be serviced as the occasion may demand. After such servicing the attendant has only to raise the receptacle and its contents until the hooks engage the apertures 42 of the flange, then swing the receptacle to position within the cover 22 where it is secured by the T-bolt 36. During this movement the spring hooks will operate to urge the member 44 and its contents against the flange member 38 or 38a thereby establishing the proper metallic connection of the enclosure member to complete the shielding. This is desirable especially in the form of Fig. 3 where the bolt 36 is seated in the floor boards 20. This procedure will cause the edge 86 of the receptacle 44 to engage the sealing strip 66 and make a weather tight connection therebetween, since the flanges 26, 38 and 38a prevent the splash from the road coming in contact with the juncture of the receptacle members, and the sealing strip prevents any moisture that might be present on the exterior of the enclosure from penetrating to the interior thereof. Thus the servicing of the unit within the receptacle 44 has been accomplished without the disturbance of any part of the vehicle proper or of the parts or parties therewithin.

While the form of embodiment of the present invention as herein disclosed, constitutes a preferred form, it is to be understood that other forms might be adopted, all coming within the scope of the claims which follow.

What is claimed is as follows:

1. In radio equipment for an automotive vehicle, said equipment including a plurality of units, the combination comprising, means for enclosing one or more of said units, and means for supporting said enclosing means from the floor boards of said vehicle, said enclosing means comprising a plurality of substantially telescoping members removably connected, said supporting means including provisions for detachably coupling said members, and provisions for maintaining the enclosing means in mating relation.

2. In radio equipment for an automotive vehicle, said equipment including a plurality of units, the combination comprising, means for enclosing one or more of said units, including a chambered member substantially enclosing said unit, a flanged cover secured to the vehicle structure and depending over the edges of said chambered member, resilient hooks secured to said chambered member and adapted for separable connection with the flange of said cover, and means depending from said cover operable to draw said chamber into sealing engagement with said cover member.

3. In radio equipment for an automotive vehicle, said equipment including a plurality of units, the combination comprising, means for enclosing one or more of said units and providing for ready access thereto, including a cover member secured beneath the floor boards of the vehicle and having depending flanges, a receptacle substantially fitting within said flanged cover, and means for retaining the receptacle in its fitting relation with said cover, said retaining means comprising a pair of resilient hooks carried by the receptacle and having removable engagement with the flange of said cover, and adjustable means engaging the receptacle for drawing the receptacle into sealing engagement with said cover.

4. In a radio receiver for automotive vehicles, a support for the batteries thereof comprising in combination, a cover member secured directly to the floor board of said vehicle, a battery receptacle for removable engagement within the said cover, means for separably securing the receptacle to the cover and providing ready access to the contents of said receptacle, and means interposed between said receptacle and cover providing a weather tight joint therebetween.

5. In radio equipment for an automotive vehicle, said equipment including a plurality of units, the combination comprising, means for enclosing one or more of said units, including a pair of drawn metal chambers for substantially telescopical engagement, resilient hooks secured to one of said chamber members and adapted for disengageable connection with the other of said members, means to maintain said chamber members in closed engagement, said means including said hooks for urging said chambers into contacting engagement.

6. In an automotive vehicle, a support for the units of a radio receiver comprising in combination, a chambered member mounted upon a part of the vehicle structure, a second chambered member, and means for detachably securing said members together, said securing means including spring hooks carried by one of said members and engageable with the other of said members, and means for drawing one of said members toward the other member, means for sealing the juncture of said chambered members and yieldably engaging one of said members when they are drawn together, and means for maintaining said chambered members in contacting engagement, said last means including said spring hooks.

7. In a radio equipment for an automotive vehicle having a floor board, a support for a radio accessory comprising a cover member, means for securing said member in contact with said floor board, a lower member for removable engagement with said cover member, means on one end of said lower member acting as a pivotal support therefor, and means depending from said cover member for supporting the other end of said lower member.

8. In a radio equipment for an automotive vehicle having a floor board, a support for a radio accessory comprising a substantially flat cover member having a depending flange, means for securing said cover member to the floor board, a lower casing member on which said accessory may rest and having an aperture in one wall thereof adapted to pass an electrical cable connected to said accessory, means for holding the upper end of said casing member adjacent said cover member and within the area defined by said depending flange and one or more resilient members engaging said depending flange and arranged to urge said casing member into engagement with said cover member whereby said members are maintained at the same potential and form an electrical shield for said radio accessory.

9. In radio equipment for an automotive vehicle, means for supporting and shielding a radio accessory comprising a lower member supporting said accessory, an upper member secured to the vehicle structure and having a depending flange, and means for retaining a portion of the upper end of said lower member in contact with a portion of said flange including a resilient hook carried by one of said members and engaging an aperture in the other of said members.

RAY C. ELLIS.